United States Patent [19]
Herzog et al.

[11] Patent Number: 5,624,549
[45] Date of Patent: Apr. 29, 1997

[54] APPARATUS FOR PARTIAL DEWATERING OF RAW SLUDGE COMPRISING RECIPROCATING PLUNGER PRESSES

[75] Inventors: Dirk Herzog, Lemgo; Wolfgang Müller, Schieder-Schwalenberg, both of Germany

[73] Assignee: Müller Umwelttechnik GmbH & Co. KG, Schieder-Schwalenberg, Germany

[21] Appl. No.: 489,326

[22] Filed: Jun. 12, 1995

[51] Int. Cl.$^6$ .............................. B01D 29/52; B01D 29/60
[52] U.S. Cl. .................. 210/98; 100/48; 100/116; 210/141; 210/196; 210/198.1; 210/340; 210/355; 210/413; 210/770
[58] Field of Search .................. 210/97, 141, 202, 210/323.1, 323.2, 340, 341, 355, 413, 414, 770, 308, 98, 196, 224, 416.1, 198.1; 417/900; 100/48, 110, 116, 127, 148

[56] References Cited

U.S. PATENT DOCUMENTS

| | | | |
|---|---|---|---|
| 2,587,997 | 3/1952 | Guettler | 100/116 |
| 3,623,607 | 11/1971 | Loos | 210/355 |
| 3,945,923 | 3/1976 | Rogers et al. | 210/323.2 |
| 4,370,232 | 1/1983 | Busse et al. | 210/224 |
| 5,051,194 | 9/1991 | Bahr | 210/770 |

Primary Examiner—Joseph W. Drodge
Attorney, Agent, or Firm—Henry M. Feiereisen

[57] ABSTRACT

Apparatus for partial dewatering of raw sludge, includes at least two filter units each defining a filter chamber which receives raw sludge and has an outer wall surface formed as filter for discharge of filtrate from raw sludge. Accommodated within the filter chamber is a double-acting plunger which extends across the entire cross section for dividing the filter chamber in two working chambers, and reciprocates in the filter chamber along the inside wall surface for movement between a first end position and a second end position, with each working chamber having an inlet for receiving raw sludge from a suitable conveying unit and an outlet for discharge of partially dewatered raw sludge. A control unit actuates valves for regulating a flow of raw sludge into the working chambers, such that raw sludge entering one working chamber forces the plunger to move from the first end position to the second end position, and raw sludge entering the other working chamber forces the plunger to move from the second end position to the first end position.

27 Claims, 2 Drawing Sheets

1

APPARATUS FOR PARTIAL DEWATERING OF RAW SLUDGE COMPRISING RECIPROCATING PLUNGER PRESSES

BACKGROUND OF THE INVENTION

The present invention refers to an apparatus for partial dewatering of raw sludge.

The process technology for operating sewage plants will be modified within the near future, for example by introducing a preliminary precipitation, a fourth clarification stage and/or an additional rain water treatment. Thus, a greater amount of sludge will be produced which, as now, will have to be supplied to digestion towers. It is expected that the increase in the amount of sludge will level out in a magnitude of 8 to 15%. Since the construction of digestion towers incurs significant investments, intense efforts are underway to find alternative treatment methods.

The use of plants for partially dewatering raw sludge is known from other technological fields. These plants, however, are of very complicated structure and cannot be suited and dimensioned to satisfy individual demands, for example sewage plants, without significantly increasing the complexity of the overall plant.

SUMMARY OF THE INVENTION

It is an object of the present invention to provide an apparatus for partially dewatering raw sludge, obviating the afore-stated drawbacks.

It is another object of the present invention to provide an improved apparatus for treatment of raw sludge by which the amount of sludge being introduced into a digestion tower is considerably reduced so as to eliminate the necessity to build additional digestion towers in order to cope with the increasing amount of raw sludge.

It is yet another object of the present invention to provide an improved apparatus for partially dewatering raw sludge which can be suited and dimensioned to satisfy prevailing conditions and yet is of simple structure and reliable in operation.

These objects and others which will become apparent hereinafter are attained in accordance with the present invention by providing at least two filter chambers, each of which accommodating a double acting plunger extending across the entire cross section for dividing the filter chamber in two working chambers, with raw sludge being alternately introduced into the working chambers to reciprocate the plunger between two end positions whereby the wall surface area of the filter chambers is designed as filtering surface for discharge of liquor or filtrate freed from the raw sludge.

The increasing amount of expected accumulating raw sludge in the near future can now be reduced in a most economical manner by providing at least two specially designed filter chambers in accordance with the present invention for dewatering the raw sludge, to thereby considerably reduce the volume of accumulating raw sludge.

The provision of a double acting plunger which extends across in each filter chamber so as to continuously run along the filtering surface is especially advantageous as the filter gaps are prevented from clogging by the passing plunger. Thus, great amounts of raw sludge can easily be dewatered without risking a shutdown of the filter through clogging.

Already a small dewatering degree is sufficient to significantly reduce the volume of raw sludge, as illustrated by the following equation which governs the correlation between dry residue prior to dewatering and dry residue after dewatering as well as the volume before and after dewatering:

$$V_{aft} = (T_{Rbef} T_{Raft}) \times V_{bef}$$

wherein $V_{aft}$ is the volume after dewatering, $V_{bef}$ is the volume before dewatering, $T_{Rbef}$ is the dry residue before dewatering, and $T_{Raft}$ is the dry residue after dewatering.

This formula clearly shows that for example at a dewatering degree of 3% dry residue before dewatering and 6% dry residue after dewatering results in a 50% volume reduction of raw sludge.

The apparatus can easily be suited to meet required capacities by designing the filter chambers in form of modules so that the overall plant may integrate a random number of filter chambers. The manufacture of the apparatus can further be simplified by symmetrically designing the filter chambers.

In order to be able to erect the apparatus in sewage plants according to their capacity, the apparatus is mounted in a frame structure, in particular of parallelepiped configuration. A simple transport as well as a stacking capability is accomplished thereby, especially when conforming the frame structure to the German Industrial Standards DIN ISO 668, DIN 15 190 and/or DIN 30 722.

Preferably, at least one sump is positioned underneath the filter chambers for collecting filtrate from the raw sludge. Thus, filtrate is accumulated in a predetermined manner and can be suitably discharged.

Most types of sludge require addition of a flocculation agent by a suitable feed unit. Thus, in accordance with another feature of the present invention, a portion of filtrate is branched off, blended with a flocculation agent, and then again returned to raw sludge which has not yet undergone a dewatering process. Flocculation agents are generally known and commercially available, e.g. under the tradename CETAG 78, distributed by the company ACM, Germany. A suitable flocculation agent is liquid polymer.

The apparatus according to the present invention has the further advantage that i.a. there is no need to incorporate a ripening tank and to include complicated control and regulation elements during admixture of the flocculation agent.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
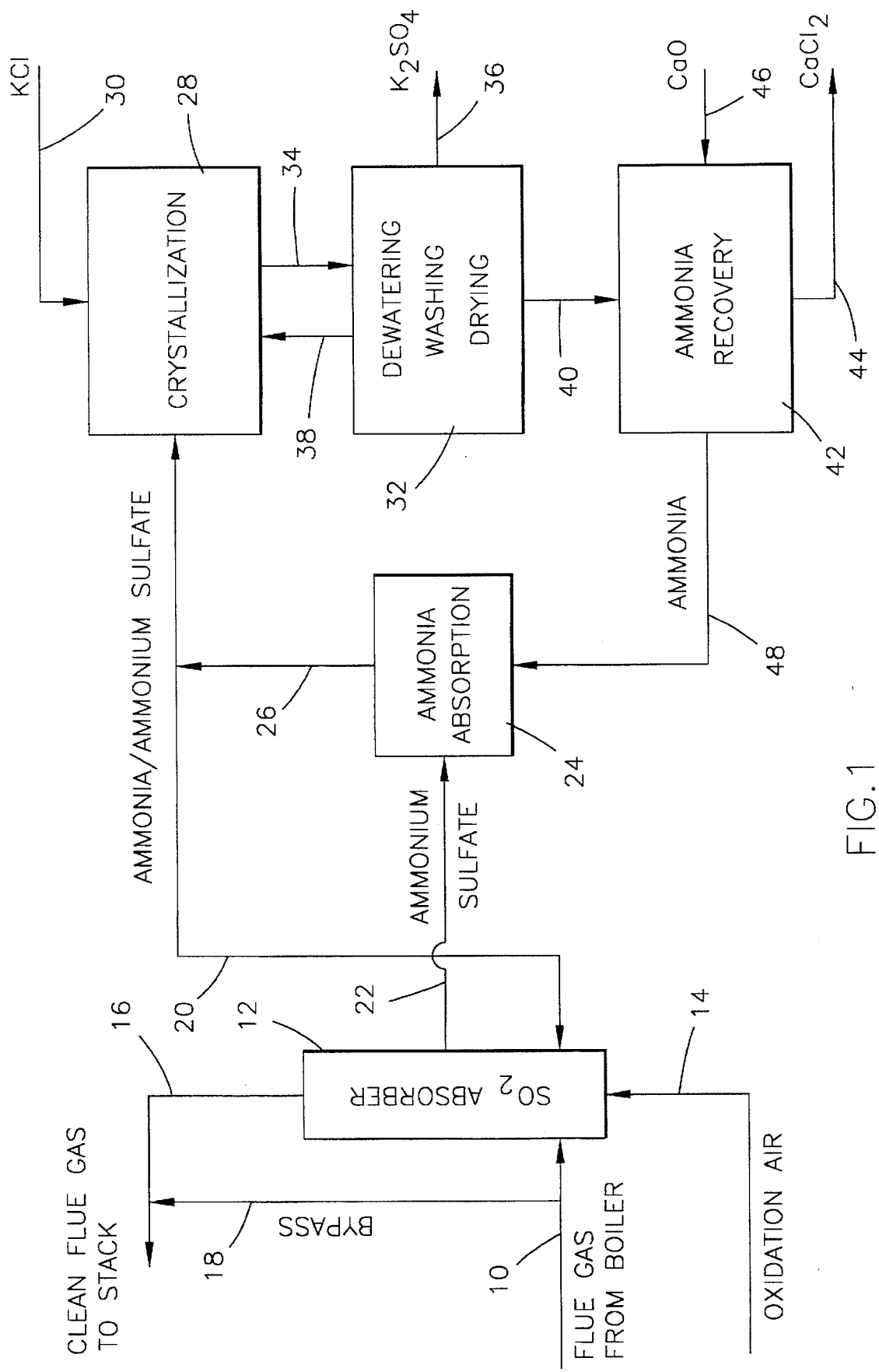
FIG. 1 is a schematic top view of one embodiment of an apparatus for partially dewatering raw sludge in accordance with the present invention.

Throughout all the Figures, the same or corresponding elements are always indicated by the same reference numerals.

Turning now to the drawing, and in particular to FIG. 1, there is shown a schematic top view of one embodiment of an apparatus for partially dewatering raw sludge, according to the present invention, including a filter assembly comprised of four filter chambers, 10, 12, 14 and 16 which are arranged in succession next to each other and suitably mounted in a frame structure 56. At one axial end of the frame structure 56 is an eccentric screw pump 18 by which raw sludge is supplied from an inlet port 40 via a main manifold 20 to each filter chamber 10, 12, 14, 16. The main manifold 20 extends from the screw pump 18 horizontally above the filter chambers 10, 12, 14, 16 and is connected to the filter chambers 10, 12, 14, 16 via feed conduits 22, 24 which respectively branch off the manifold 20 to enter the filter chambers 10, 12, 14, 16 from their opposing axial ends.

Accommodated within each filter chamber 10, 12, 14, 16 is a plunger 30 which is freely movably supported for reciprocation between two end positions. The plunger 30 extends across the entire cross section of the filter chamber 10, 12, 14 16 and is guided along the inside wall surface so as to divide the filter chamber 10, 12, 14, 16 into two working chambers 32, 34. Positioned about the circumference of the plunger 30 is a sealing lip 31 to hermetically separate in cooperation with the plunger 30 both working chambers 32, 34 from each other. Thus, raw sludge is prevented from penetrating from one working chamber 32, 34 to the other working chamber 32, 34. The sealing lip 31 is dimensioned and formed in such a manner that a higher pressure within the working chambers 32, 34 will increase the pressure by which the sealing lip 31 is forced against the inside surface wall of the filter chamber 10, 12, 14, 16.

As stated above, the filter chambers 10, 12, 14, 16 are supplied with raw sludge via feed conduits 22, 24 which enter the filter chambers 10, 12, 14, 16 from their axial ends, with the working chamber 32 of each filter chamber 10, 12, 14, 16 being connected to the feed conduit 22, and the working chamber 34 communicating with the feed conduit 24. As further shown in FIG. 1, each working chamber 32, 34 further communicates with an exit conduit 26, 28.

In order to control the inflow of raw sludge from the main manifold 20 into the working chambers 32, 34, a valve 36 is incorporated in each feed conduit 22 and a second valve 38 is incorporated in each feed conduit 24. The valves 36, 38 are operatively connected to a suitable control unit (not shown) with proximity switches, so that the valves 36, 38 are actuated in a predetermined manner as will be described furtherbelow.

The filter chambers 10, 12, 14, 16 are of hollow cylindrical configuration, with the wall surface area of the filter chambers 10, 12, 14, 16 being formed as gap filters.

The operation of the apparatus is as follows:

Raw sludge entering through inlet port 40 is conveyed by the eccentric screw pump 18 through the main manifold 20 and to the individual feed conduits 22, 24 of the filter chambers 10, 12, 14, 16. The first and second valves 36, 38 are alternately opened and closed by the control unit in such a manner that the plunger 30 reciprocates from one axial end position to the other axial end position. For example, when the control unit opens the valves 36 and closes the valves 38, raw sludge enters the working chambers 32 of each filter chamber 10, 12, 14, 16 from one axial end through feed conduits 22 and forces the plungers 30 in the filter chambers 10, 12, 14, 16 to move from the extreme left position to the extreme right end position. At this point, when the control unit closes the valves 36 and opens the valves 38, raw sludge enters the working chambers 34 from the other axial end through the feed conduits 24 for moving the plungers 30 into the first or left end position. Thus, during movement of each plunger 30 from the first end position into the second end position, the first valve 36 is open and the second valve 38 is closed, whereby raw sludge entering the first working chamber 32 effects a shift of the plunger 30 to the right, while raw sludge in the other working chamber 34 is pushed out through exit conduit 28 at the same time. A displacement of the plunger 30 from the second end position into the first end position is effected by opening the second valve 38 and closing the first valve 36 so that the plunger 30 is shifted to the left to thereby push out raw sludge from the working chamber 32 through exit conduit 26. The working pressure for dewatering and transporting raw sludge amounts to 6 bar.

During reciprocation, the plunger 30 together with its sealing lip 31 runs along the filtering surface of the respective filter chambers 10, 12, 14, 16 to prevent a clogging of the filter gaps.

Figure 2:
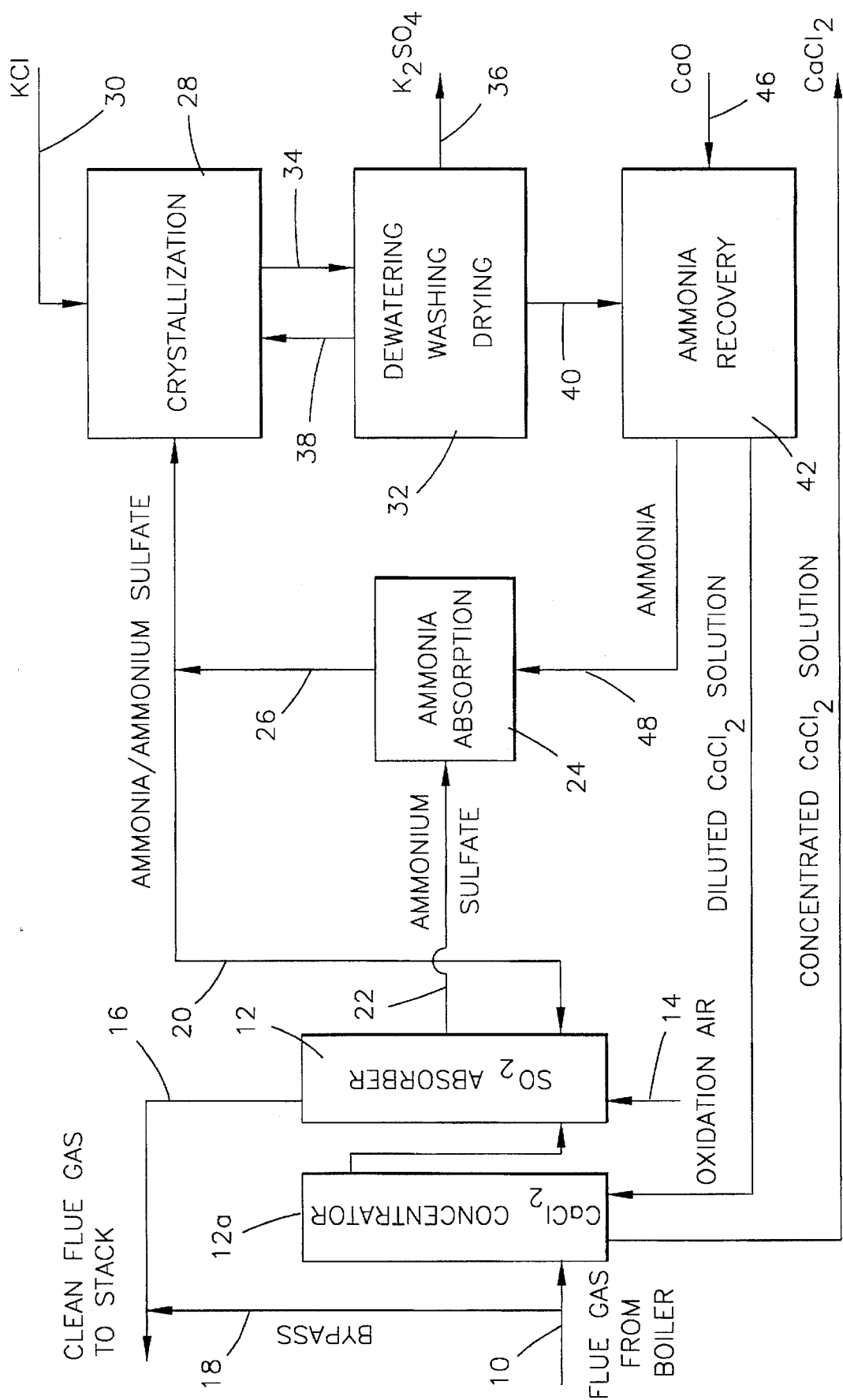
FIG. 2 is a schematic front view of the apparatus of FIG. 1.

The exit conduits 26, 28 project centrally from the axial ends of the filter chambers 10, 12, 14, 16 and respectively communicate with the working chambers 32, 34 for discharge of dewatered raw sludge during reciprocation of the plungers 30. As shown in FIG. 2, underneath the filter chambers 10, 12, 14, 16 is a container 54 for receiving dewatered sludge exiting the conduits 26, 28 in a direction as indicated by arrows 64. Incorporated in each exit conduit 26, 28 is a gate valve 41 by which the cross section of the exit conduit 26, 28 can be modified and even be completely closed. By changing the cross section of the exit conduits 26, 28, the flow resistance can be adjusted for dewatered raw sludge exiting the filter chambers 10, 12, 14, 16 and utilized to control the dewatering pressure in the filter chambers 10, 12, 14, 16.

As best seen from FIG. 1, the filter chambers 10, 12, 14, 16 are of symmetric configuration relative to an axis oriented parallel to the longitudinal axis as defined by the main manifold 20. Positioned underneath the filter chambers 10, 12, 14, 16 is a sump 42 for collecting filtrate exiting through the filtering surface of the filter chambers 10, 12, 14, 16 during reciprocation of the plunger 30. Filtrate simply drops down to the sump 42, as indicated by arrows 62 and is collected and discharged through an outlet 44. At one axial end, the sump 42 is connected to a conduit 46 by which a portion of filtrate is withdrawn from the sump 42 by means of a centrifugal pump 48 and, if necessary, mixed with fresh water supplied through a fresh water connection 50. Subsequently, withdrawn filtrate is transported to a feed unit 52 for adding flocculation agent, in particular liquid polymer. It is noted that flocculation agents are generally known and commercially available, e.g. under the tradename CETAG 78.

A diaphragm-type reciprocating pump 58 or an eccentric screw pump supplies the flocculation agent in a predetermined manner to the filtrate. After admixing flocculation agent, the withdrawn portion of filtrate is returned to raw sludge inflowing through inlet 40 for further transport to the main manifold 20 by means of the eccentric screw pump 18. Raw sludge blended with filtrate and liquid polymer as flocculation agent is then advanced by the eccentric screw pump 18 via the main manifold 20 and via the feed conduits 22, 24 into the filter chambers 10, 12, 14, 16 for partial dewatering in the above described manner.

All components of the apparatus are incorporated in the frame structure 56 which preferably is of essentially parallelepiped structure and conforms to German Industrial Standards DIN ISO 668, DIN 15 190 and/or DIN 30 722. Thus, several apparatuses can be stacked above each other and transported in a simple manner by respective motor vehicles. Through the modular and symmetric configuration of the filter chambers 10, 12, 14, 16, the overall apparatus can be dimensioned and suited to individual demands, i.e. required dewatering capacities for raw sludge.

As described above, partially dewatered raw sewage is received in the container 54 which serves as collector for raw sludge and thus as buffer during transport and treatment of raw sludge. A feed pump 60 connected to the container 54 transports dewatered raw sludge subsequently to a not shown digestion tower for further processing in a known manner.

Persons skilled in the art will understand that the overall apparatus is not limited to the provision of four filter chambers as described by the example above; Rather, the modular structure of the filter chambers allows the application of more or less than four such filter chambers, with only the pumps being required to adjust. Thus, the apparatus according to the invention can be expanded in a desired manner and is further characterized by its simplicity and its economical operation.

While the invention has been illustrated and described as embodied in an apparatus for partially dewatering raw sludge, it is not intended to be limited to the details shown since various modifications and structural changes may be made without departing in any way from the spirit of the present invention.

What is claimed as new and desired to be protected by Letters Patent is set forth in the appended claims:

We claim:

1. Apparatus for partial dewatering of raw sludge, comprising:

a filtering assembly including at least two filter chambers receiving raw sludge under pressure, each filter chamber having an inside wall and incorporating a double-acting plunger extending across an entire cross section thereof for dividing the filter chamber into first and second working chambers, said plunger reciprocating in said filter chamber and being guided along the inside wall thereof for movement between a first end position and a second end position, each of said first and second working chambers having an inlet for receiving raw sludge and an outlet for discharge of partially dewatered raw sludge, with said filter chambers each having a wall surface area formed as a filter for discharge of filtrate from raw sludge;

transport means, including an eccentric screw pump, for supplying raw sludge via the inlets into said working chambers for movement of said plunger into respective end positions;

valve means for controlling a flow of raw sludge from said eccentric screw pump to the inlets of said working chambers; and a control unit operatively connected to and actuating said valve means in such a manner that, for each filter chamber, raw sludge entering one working chamber forces said plunger to move from the first end position to the second end position and raw sludge entering the other working chamber forces said plunger to move from the second end position to the first end position.

2. The apparatus of claim 1 wherein said valve means includes a first valve positioned upstream of said first working chamber, and a second valve positioned upstream of said second working chamber.

3. The apparatus of claim 1 wherein said filter chambers are of a modular configuration to allow integration of a random number of filter chambers.

4. The apparatus of claim 1 wherein said filter chambers are arranged symmetrically.

5. The apparatus of claim 1, further comprising, for each filter chamber, respective control members operatively connected to the outlets of said first and second working chambers for modifying a cross section of the outlets to thereby allow adjustment of an outflow resistance of raw sludge and a closing of the outlets.

6. The apparatus of claim 5 wherein said control members are slide valves.

7. The apparatus of claim 1, further comprising a frame structure for substantially supporting the entire apparatus.

8. The apparatus of claim 7 wherein said frame structure is of parallelepiped configuration.

9. The apparatus of claim 7 wherein said frame structure conforms to German Industrial Standards selected from the group consisting of DIN ISO 668, DIN 15 190 and DIN 30 722.

10. The apparatus of claim 1, further comprising a sump positioned underneath said filter chambers for collecting filtrate separated from raw sludge.

11. The apparatus of claim 1, further comprising a feed pump connected to the respective outlets of said first and second working chambers.

12. The apparatus of claim 11, further comprising a container positioned between said feed pump and the respective outlets of said first and second working chambers for forming a buffer for partially dewatered raw sludge.

13. The apparatus of claim 1 wherein said transport means generates a sludge pressure of 6 bar.

14. The apparatus of claim 1, further comprising a feed unit positioned upstream of said transport means for adding flocculation agent.

15. The apparatus of claim 14, further comprising a return unit withdrawing a portion of filtrate, said return unit being connected to said feed unit so that raw sludge is mixed with withdrawn filtrate and flocculating agent.

16. The apparatus of claim 15 wherein said return unit includes a centrifugal pump.

17. The apparatus of claim 14 wherein the flocculation agent is liquid polymer.

18. The apparatus of claim 14 wherein said feed unit includes a diaphragm-type reciprocating pump.

19. The apparatus of claim 14 wherein said feed unit includes an eccentric screw pump.

20. The apparatus of claim 1 wherein said control unit includes a proximity switch for control of said valve means.

21. Apparatus for partial dewatering of raw sludge, comprising:

a filtering assembly including at least two filter chambers receiving raw sludge under pressure, each filter chamber having an inside wall and a wall surface area formed as a filter for discharge of filtrate separated from raw sludge and incorporating a double-acting plunger to divide the filter chamber into two working chambers with each adapted for entry of raw sludge and discharge of dewatered sludge and filtrate, said plunger reciprocating in said filter chamber and being guided along the inside wall thereof for movement between a first end position and a second end position, transport means, including an eccentric screw pump, for supplying raw sludge to said working chambers; and a control unit for selectively controlling a flow of raw sludge from said transport means to said working chambers in such a manner that, for each filter chamber, raw sludge entering one working chamber forces said plunger to move from one end position to the other end position, thereby pushing dewatered raw sludge out of said other working chamber and discharging filtrate through the wall surface area of said filter chamber.

22. Apparatus for partial dewatering of raw sludge, comprising:

a filtering assembly including at least two filter chambers receiving raw sludge under pressure, each filter chamber having an inside wall and incorporating a double-acting plunger extending across an entire cross section thereof for dividing the filter chamber into first and second working chambers, said plunger reciprocating in said filter chamber and being guided along the inside wall thereof for movement between a first end position and a second end position, each of said first and second working chambers having an inlet for receiving raw sludge and an outlet for discharge of partially dewatered raw sludge, with said filter chambers each having a wall surface area formed as a filter for discharge of filtrate from raw sludge;

transport means for supplying raw sludge via the inlets into said working chambers for movement of said plunger into respective end positions;

valve means for controlling a flow of raw sludge from said transport means to the inlets of said working chambers;

a control unit operatively connected to and actuating said valve means in such a manner that, for each filter chamber, raw sludge entering one working chamber forces said plunger to move from the first end position to the second end position and raw sludge entering the other working chamber forces said plunger to move from the second end position to the first end position; and a feed unit, including an eccentric screw pump, positioned upstream of said transport means for adding flocculation agent.

23. Apparatus for partial dewatering of raw sludge, comprising:

a filtering assembly including at least two filter chambers receiving raw sludge under pressure, each filter chamber having an inside wall and incorporating a double-acting plunger extending across an entire cross section thereof for dividing the filter chamber into first and second working chambers, said plunger reciprocating in said filter chamber and being guided along the inside wall thereof for movement between a first end position and a second end position, each of said first and second working chambers having an inlet for receiving raw sludge and an outlet for discharge of partially dewatered raw sludge, with said filter chambers each having a wall surface area formed as a filter for discharge of filtrate from raw sludge;

transport means for supplying raw sludge via the inlets into said working chambers for movement of said plunger into respective end positions;

valve means for controlling a flow of raw sludge from said transport means to the inlets of said working chambers;

a control unit operatively connected to and actuating said valve means in such a manner that, for each filter chamber, raw sludge entering one working chamber forces said plunger to move from the first end position to the second end position and raw sludge entering the other working chamber forces said plunger to move from the second end position to the first end position;

a feed unit positioned upstream of said transport means for adding flocculation agent; and a return unit, including a centrifugal pump, for withdrawing a portion of filtrate, said return unit being connected to said feed unit so that raw sludge is mixed with withdrawn filtrate and flocculating agent.

24. Apparatus for partial dewatering of raw sludge, comprising:

a filtering assembly including at least two filter chambers receiving raw sludge under pressure, each filter chamber incorporating a double-acting plunger extending across an entire cross section thereof for dividing the filter chamber into first and second working chambers, said plunger reciprocating in said filter chamber and being guided along the inside wall thereof for movement between a first end position and a second end position, each of said first and second working chambers having an inlet for receiving raw sludge and an outlet for discharge of partially dewatered raw sludge, with said filter chambers each having a wall surface area formed as a filter for discharge of filtrate from raw sludge;

transport means for supplying raw sludge via the inlets into said working chambers for movement of said plunger into respective end positions;

valve means for controlling a flow of raw sludge from said transport means to the inlets of said working chambers;

a control unit operatively connected to and actuating said valve means in such a manner that, for each filter chamber, raw sludge entering one working chamber forces said plunger to move from the first end position to the second end position and raw sludge entering the other working chamber forces said plunger to move from the second end position to the first end position; and a feed unit, including a diaphragm-type reciprocating pump, positioned upstream of said transport means for adding flocculation agent.

25. Apparatus for partial dewatering of raw sludge, comprising:

a filtering assembly including at least two filter chambers receiving raw sludge under pressure, each filter chamber having an inside wall and having a wall surface area formed as a filter for discharge of filtrate separated from raw sludge and incorporating a double-acting plunger to divide the filter chamber into two working chambers with each adapted for entry of raw sludge and discharge of dewatered sludge and filtrate, said plunger reciprocating in said filter chamber and being guided along the inside wall thereof for movement between a first end position and a second end position, transport means for supplying raw sludge to said working chambers;

a control unit for selectively controlling a flow of raw sludge from said transport means to said working chambers in such a manner that, for each filter chamber, raw sludge entering one working chamber forces said plunger to move from one end position to the other end position, thereby pushing dewatered raw sludge out of said other working chamber and discharging filtrate through the wall surface area of said filter chamber; and a feed unit, including an eccentric screw pump, positioned upstream of said transport means for adding flocculation agent.

26. Apparatus for partial dewatering of raw sludge, comprising:

a filtering assembly including at least two filter chambers receiving raw sludge under pressure, each filter chamber having an inside wall and a wall surface area formed as a filter for discharge of filtrate separated from raw sludge and incorporating a double-acting plunger to divide the filter chamber into two working chambers with each adapted for entry of raw sludge and discharge of dewatered sludge and filtrate, said plunger reciprocating in said filter chamber and being guided along the inside wall thereof for movement between a first end position and a second end position, transport means for supplying raw sludge to said working chambers;

a control unit for selectively controlling a flow of raw sludge from said transport means to said working chambers in such a manner that, for each filter chamber, raw sludge entering one working chamber forces said plunger to move from one end position to the other end position, thereby pushing dewatered raw sludge out of said other working chamber and discharging filtrate through the wall surface area of said filter chamber; and a feed unit positioned upstream of said transport means for adding flocculation agent; and a return unit, including a centrifugal pump, for withdrawing a portion of filtrate, said return unit being connected to said feed unit so that raw sludge is mixed with withdrawn filtrate and with flocculating agent.

27. Apparatus for partial dewatering of raw sludge, comprising:

a filtering assembly including at least two filter chambers receiving raw sludge under pressure, each filter chamber having an inside wall and a wall surface area formed as a filter for discharge of filtrate separated from raw sludge and incorporating a double-acting plunger to divide the filter chamber into two working chambers with each adapted for entry of raw sludge and discharge of dewatered sludge and filtrate, said plunger reciprocating in said filter chamber and being guided along the inside wall thereof for movement between a first end position and a second end position, transport means for supplying raw sludge to said working chambers;

a control unit for selectively controlling a flow of raw sludge from said transport means to said working chambers in such a manner that, for each filter chamber, raw sludge entering one working chamber forces said plunger to move from one end position to the other end position, thereby pushing dewatered raw sludge out of said other working chamber and discharging filtrate through the wall surface area of said filter chamber; and a feed unit, including a diaphragm-type reciprocating pump, positioned upstream of said transport means for adding flocculation agent.

* * * * *